May 8, 1956  R. E. KOONS  2,744,926
PREPARATION OF ACRYLONITRILE
Filed Oct. 22, 1951
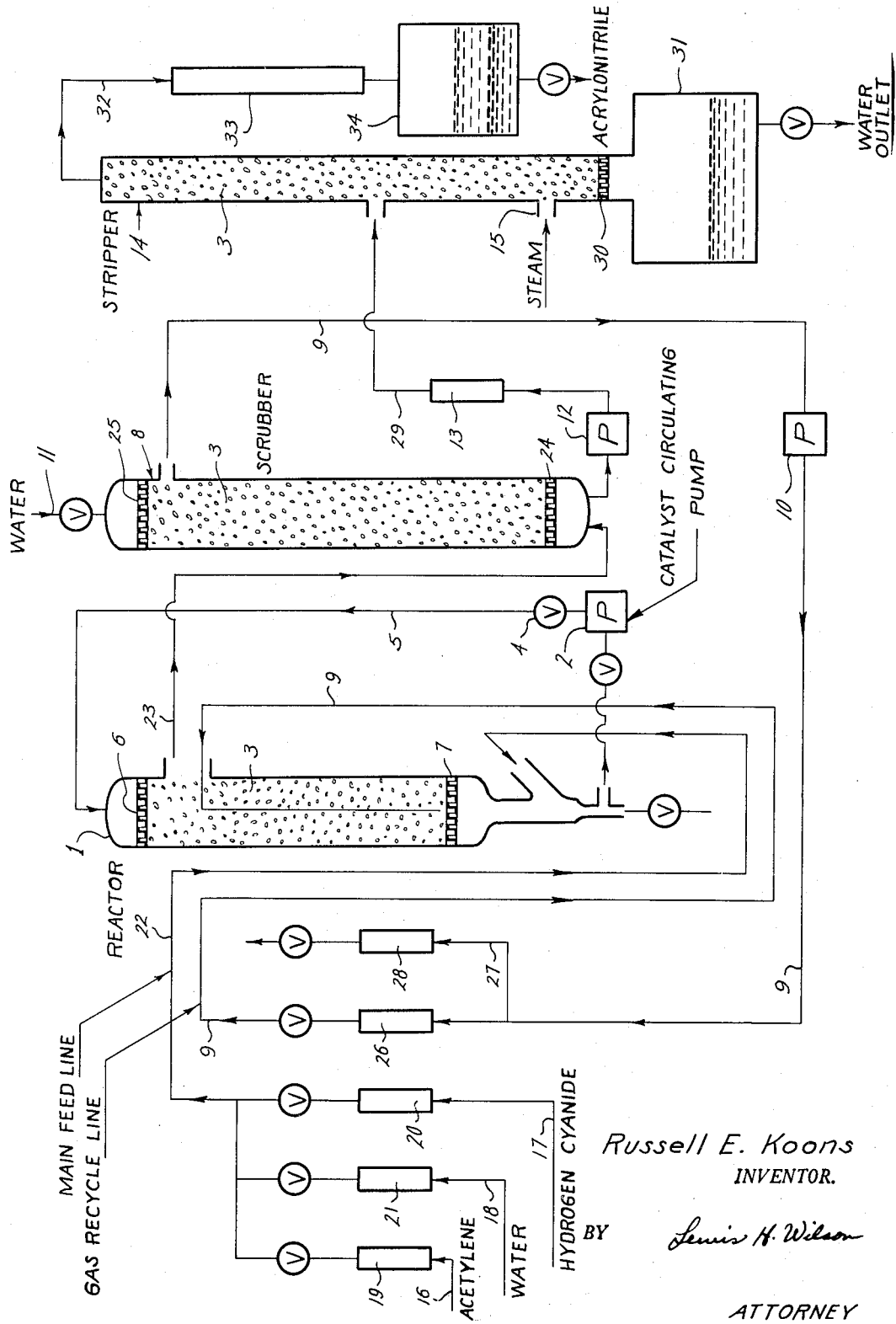
Russell E. Koons
INVENTOR.
BY Lewis H. Wilson
ATTORNEY

United States Patent Office 2,744,926
Patented May 8, 1956

2,744,926
PREPARATION OF ACRYLONITRILE

Russell E. Koons, El Dorado, Ark., assignor, by mesne assignments, to Monsanto Chemical Company, St. Louis, Mo., a corporation of Delaware Application October 22, 1951, Serial No. 252,562

4 Claims. (Cl. 260—465.3)

This invention relates to the production of acrylonitrile and more particularly to an improved process of preparing acrylonitrile from acetylene and hydrogen cyanide in the presence of an aqueous cuprous chloride complex as catalyst, in which process the catalyst is circulated countercurrent to the acetylene, the hydrogen cyanide being rapidly absorbed by the catalyst.

It is known that acrylonitrile can be prepared by reacting together acetylene and hydrogen cyanide in the presence of an acidic aqueous cuprous chloride complex as catalyst. The catalyst is charged into a reactor, and then gaseous acetylene is passed through the stationary catalyst while adding thereto gaseous hydrogen cyanide. Ammonium chloride, alkali metal chlorides such as potassium chloride, and an amine hyrochloride such as ethanol amine hyrochloride have been used as aids in bringing the cuprous chloride catalyst into solution. Strong mineral acids such as hydrochloric, sulfuric, phosphoric and hydrobromic acids have been used to adjust the catalyst to the desired acidity. Usually a small amount of metallic copper is used to reduce the cupric salts ordinarily present in cuprous chloride and to maintain the soluble copper in the cuprous condition. Since the catalyst oxidizes easily, care is taken that the hydrogen cyanide and acetylene are essentially oxygen free. The foregoing conventional process is carried out at a temperature of about 80° C.–90° C.

Concerning the reaction discussed in the immediately preceding paragraph, it is also known that the rate at which hydrogen cyanide is added to the catalyst and the acetylene/hydrogen cyanide ratio employed are important factors affecting the performance of the catalyst, the formation of by-products, and therefore the yield of acrylonitrile. Preferably the hydrogen cyanide quantity is about 0.02–0.03 part of hydrogen cyanide per part of cuprous chloride per hour. Perferably the molar ratio of acetylene to hydrogen cyanide is about 5/1 to 7/1.

With reference to this conventional process, any desired amount of hydrogen cyanide readily dissolves in the catalyst almost immediately upon contact therewith, but it is very difficult to dissolve the desired amount of acetylene in the catalyst. If an insufficient quantity of acetylene is dissolved in the catalyst, the yield of acrylonitrile will be low.

While the above described conventional process represents a substantial contribution to the art, it is not entirely satisfactory. One drawback of primary concern is that the yield of acrylonitrile is undersiably low.

An object of the present invention is to provide an improved process of preparing acrylonitrile from acetylene, hydrogen cyanide, and a cuprous chloride complex catalyst. A further object is to provide such a process characterized by a surprising high yield of acrylonitrile. These and other objects will be apparent from the description of this invention given hereinafter.

The above objects are accomplished according to this invention by reacting together gaseous acetylene and hydrogen cyanide in contact with an aqueous cuprous chloride complex as catalyst, the catalyst being circulated countercurrent to the acetylene.

In order that the present invention may be more readily understood, it will be described with reference to the accompanying drawing illustrating in flow-sheet form one type of apparatus which can be used in practicing the invention. Thus in practicing the instant invention according to a preferred embodiment thereof, initially the apparatus was charged with nitrogen in order to free the apparatus of oxygen. The aqueous cuprous chloride complex was heated to the desired reaction temperature, usually about 80° C.–95° C., and introduced into the reactor 1. Sufficient catalyst was added so that the catalyst circulating pump 2, which was started immediately after addition of the catalyst to the reactor, could supply a heavy flow of liquid through the reactor packing 3 (e. g. of Beryl Saddles), and still maintain some liquid phase at the pump suction. If desired the valve 4 in the catalyst circulating line 5 can be throttled to aid in maintaining this condition. Perforated plates 6 and 7 are located in the top and bottom of the reactor. Thus the catalyst was continuously circulated through the reactor from the bottom to the top thereof. Suitable means (not shown), e. g. steam or electrical heating means on the reactor 1 and/or catalyst circulating line 5, was provided for maintaining the catalyst at the desired temperature. The nitrogen was caused to flow through the reactor 1, scrubber 8 and gas recycle line 9 by starting the compressor pump 10. Flow of water was started through line 11 into the top of scrubber 8 and continuously removed from the bottom thereof by a pump 12 and passed through a rotameter 13 into a stripper 14. The water feed was adjusted so as to supply approximately a 2% solution of acrylonitrile to the stripper. The flow of steam through line 15 into the base of the stripper was started in order to maintain the proper stripper temperature (usually about 95° C.) for removing the acrylonitrile from the bulk of the water.

The unit is now ready for starting a run. Acetylene and hydrogen cyanide gases and water were fed through line 16, 17 and 18 and rotameters 19, 20 and 21 located therein, at a controlled rate into a common feed line 22 which enters the bottom of reactor 1, an excess of acetylene to hydrogen cyanide being employed. It will be recalled that the circulating pump 2 is operating and circulating the liquid catalyst from the bottom to the top of the reactor 1. Thus, throughout the reaction there was maintained in the reactor a flow of liquid catalyst countercurrent to the flow of acetylene therein.

The unreacted acetylene and other gases present and the acrylonitrile formed, in addition to certain impurities, passed out the top of the reactor 1 and into the bottom of the scrubber 8 through line 23. The scrubber comprises a vertical column packed with Beryl Saddles 3 supported on a perforated plate 24. A perforated distribution plate 25, through which the water from line 11 passes, is located in the top of the scrubber. Water introduced at the top of the scrubber through line 11 dissolved the acrylonitrile from the reactor outlet gases, after which these gases passed out the top of the scrubber through line 9 and were pumped at a controlled rate back into the reactor 1 by means of the pump 10 and rotameter 26. Line 27, containing rotameter 28, leads off line 9 and serves to vent any desired portion of the recycle gases. The remaining water solution of acrylonitrile together with impurities were pumped from the scrubber through line 29 into about the center of the stripper 14 at a metered rate by means of pump 12 and rotameter 13. The stripper 14 comprises a vertical column packed with Beryl Saddles 3 supported on a perforated plate 30. In order to maintain the stripper feed at the desired temperature, steam was introduced into the stripper at a point just above the plate 30. At the bottom the stripper communicates with a container 31 which serves as a water reservoir. Steam and acrylonitrile vapors issued from the top of the stripper through line 32 and passed into a condenser 33 where the vapors were condensed and the condensate received in a vessel 34. The condensate, consisting primarily of acrylonitrile and water in two separate layers, was drawn off and separated.

According to the present invention it has been found that a very substantial and surprising increase in yield of acrylonitrile results by carrying out the reaction as just outlined. An outstanding and essential feature of this invention resides in providing contact between the catalyst and reactant gases in substantially the manner shown which includes the important step of continuously circulating the liquid catalyst countercurrent to the acetylene. Because of the importance of this phase of the instant invention, it will now be described in greater detail. The plate 6 at the top of the reactor 1 contains a multiplicity of very fine holes which spray the liquid catalyst down through the reactor and over the Beryl Saddle packing 3 in fine streams countercurrent to the gaseous streams of acetylene issuing from a plurality of holes in the plate 7 in the bottom of the reactor and then passing up through the reactor over the Bery Saddle packing. 3. Under these conditions the major phase in the reactor is a vapor phase and the minor phase is liquid. In this manner and with the catalyst being continuously circulated through the reactor, the large increase in yield of acrylonitrile obtained is surprising as compared with the yield of acrylonitrile obtained with conventional practices in which the catalyst is relatively static. The reason for this increase in yield is not fully understood but presumably it is due at least in part to increased contact between the catalyst and acetylene. However, certain evidence indicates that the increase in yield cannot be attributed entirely to providing greater contact between catalyst and acetylene. For instance, with prior art methods increased contact effected by means of agitation did not noticeably increase the yield.

The foregoing description was given in order to illustrate the invention more clearly and not as a limitation thereof. Within the scope of this invention various modifications can be made in the process and apparatus for carrying out the same, provided the catalyst is circulated and contact between the two phases maintained in general as set forth hereinbefore. The acetylene and hydrogen cyanide may be added to the reactor through separate lines. Preferably the acetylene is added to the lower portion of the reactor in order to obtain greater contact with the catalyst. The point at which the hydrogen cyanide is added is not critical, provided it is added at a point such that it will not be swept out of the reactor by the recycle gases. It is very satisfactory to add the hydrogen cyanide below the bottom plate 7 in the reactor as shown in the drawing, or in the catalyst circulating line 5, desirably on the pump suction side of this line.

The following examples, wherein percent and parts are by weight, illustrate specific embodiments of this invention. All yields are based on acrylonitrile of a purity of 100 percent.

EXAMPLE I

This example shows two runs made according to the conventional method described above, i. e. the catalyst was charged into a reactor, and then acetylene was passed through the catalyst while adding thereto hydrogen cyanide. Otherwise the process and apparatus were essentially as described above with reference to the present invention.

*Static catalyst*

| Run Number | 92-33 | 92-75 |
| --- | --- | --- |
| Yield in Parts acrylonitrile/100 parts CuCl/hr | 2.5 | 2.9 |
| Yield in percent based on HCN | 61 | 66.4 |
| Yield in percent based on $C_2H_2$ | 57.2 | 51.7 |
| Duration of run in hours | 96 | 13.5 |

EXAMPLE II

This example shows two runs made according to the present invention employing the conditions and apparatus described above and in the drawing.

*Circulating catalyst*

| Run Number | 105-5A and 105-5B | 92-56 |
| --- | --- | --- |
| Yield in Parts acrylonitrile/100 parts CuCl/hr | 5.61 | 5.5 |
| Yield in percent based on HCN | 79.2 | 80 |
| Yield in percent based on $C_2H_2$ | 64.3 | 65.6 |
| Duration of run in hours | 48.5 | 12 |

By comparing Examples I and II above it will readily be seen that the yield of acrylonitrile obtained according to this invention is substantially greater than that obtained according to the prior art method, this prior art method being one of the best methods heretofore known for the production of acrylonitrile.

As many apparently widely different embodiments of this invention may be made without departing from the spirit and scope thereof, it is to be understood that the invention is not limited to the specific embodiments thereof except as defined in the appended claims.

What is claimed is:

1. In a method of preparing acrylonitrile wherein acetylene and hydrogen cyanide are reacted together in the presence of a liquid cuprous chloride complex as catalyst, the improvement which comprises continuously recirculating said liquid cuprous chloride catalyst through the reaction zone for said reactants countercurrent to the flow of acetylene through said zone, with said catalyst being reintroduced to said reaction zone in the form of a liquid spray during the course of recirculation.

2. In a method of preparing acrylonitrile wherein acetylene and hydrogen cyanide are reacted together in the reaction zone of a packed column in the presence of a liquid cuprous chloride complex as catalyst, the improvement which comprises continuously recirculating said liquid catalyst from the bottom of said reaction zone to the top thereof so as to flow through said reaction zone countercurrent to the flow of acetylene therethrough, with said liquid catalyst being reintroduced to the top of said reaction zone in the form of a finely dispersed liquid spray.

3. In a method of preparing acrylonitrile wherein acetylene and hydrogen cyanide are reacted together in the presence of a liquid cuprous chloride complex as catalyst, the improvement which comprises continuously recirculating said liquid catalyst during said reaction so as to flow countercurrent to the flow of reactant acetylene, with said catalyst being reintroduced into the presence of said reactants in the form of an aqueous spray, said reaction being carried out at a temperature of 80° C.–95° C., with about 0.02–0.03 part by weight of hydrogen cyanide per part by weight of cuprous chloride per hour and a ratio of acetylene/hydrogen cyanide of about 5/1–7/1.

4. In a method of preparing acrylonitrile wherein acetylene and hydrogen cyanide are reacted together in a packed column comprising a reaction zone in the presence of an aqueous cuprous chloride complex as catalyst, the improvement which comprises continuously removing the aqueous catalyst from the bottom of said reaction zone and introducing said catalyst into the top of said zone in the form of very fine liquid streams so as to flow countercurrent to the flow of acetylene through said zone, said reaction being carried out at a temperature of 80° C.–95° C., with about 0.02–0.03 part by weight of hydrogen cyanide per part by weight of cuprous chloride per hour and a ratio of acetylene/hydrogen cyanide of about 5/1–7/1.

(References on following page)

References Cited in the file of this patent

UNITED STATES PATENTS

| | | |
|---|---|---|
| 2,385,327 | Bradley et al. | Sept. 25, 1945 |
| 2,385,470 | Salley et al. | Sept. 25, 1945 |
| 2,476,771 | Salzberg | July 19, 1949 |
| 2,561,787 | Denton et al. | July 24, 1951 |
| 2,642,454 | Mahan et al. | June 16, 1953 |

FOREIGN PATENTS

| | | |
|---|---|---|
| 593,851 | Great Britain | Oct. 28, 1947 |
| 636,034 | Great Britain | Apr. 19, 1950 |

OTHER REFERENCES

Fiat Final Report No. 836.
Fiat Final Report No. 1125.